Feb. 6, 1940.  A. A. LOWEKE  2,189,013
FLUID PRESSURE SYSTEM
Filed Dec. 11, 1937   3 Sheets-Sheet 1
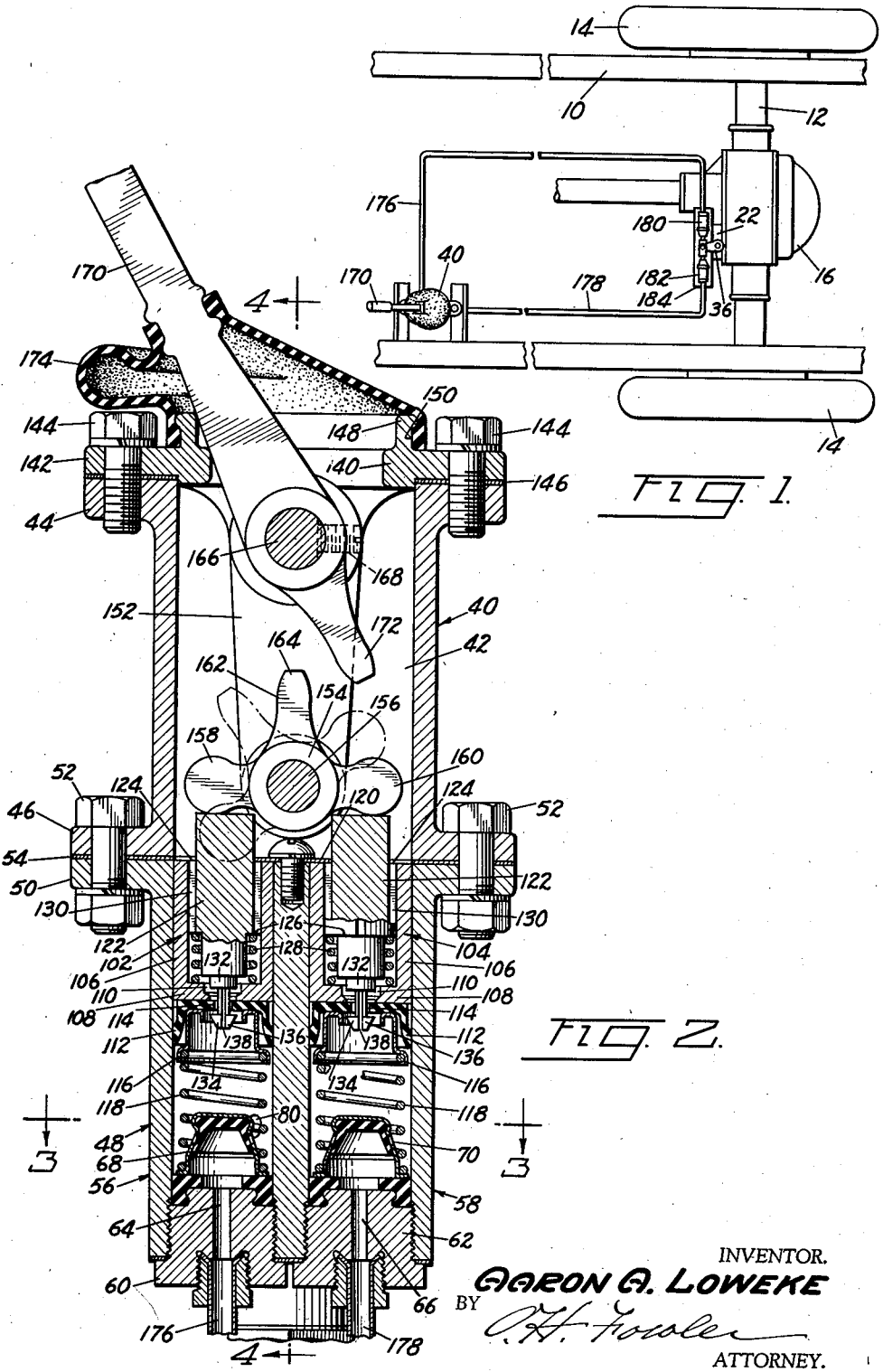
INVENTOR.
AARON A. LOWEKE
BY
ATTORNEY.

Feb. 6, 1940.  A. A. LOWEKE  2,189,013
FLUID PRESSURE SYSTEM
Filed Dec. 11, 1937  3 Sheets-Sheet 2
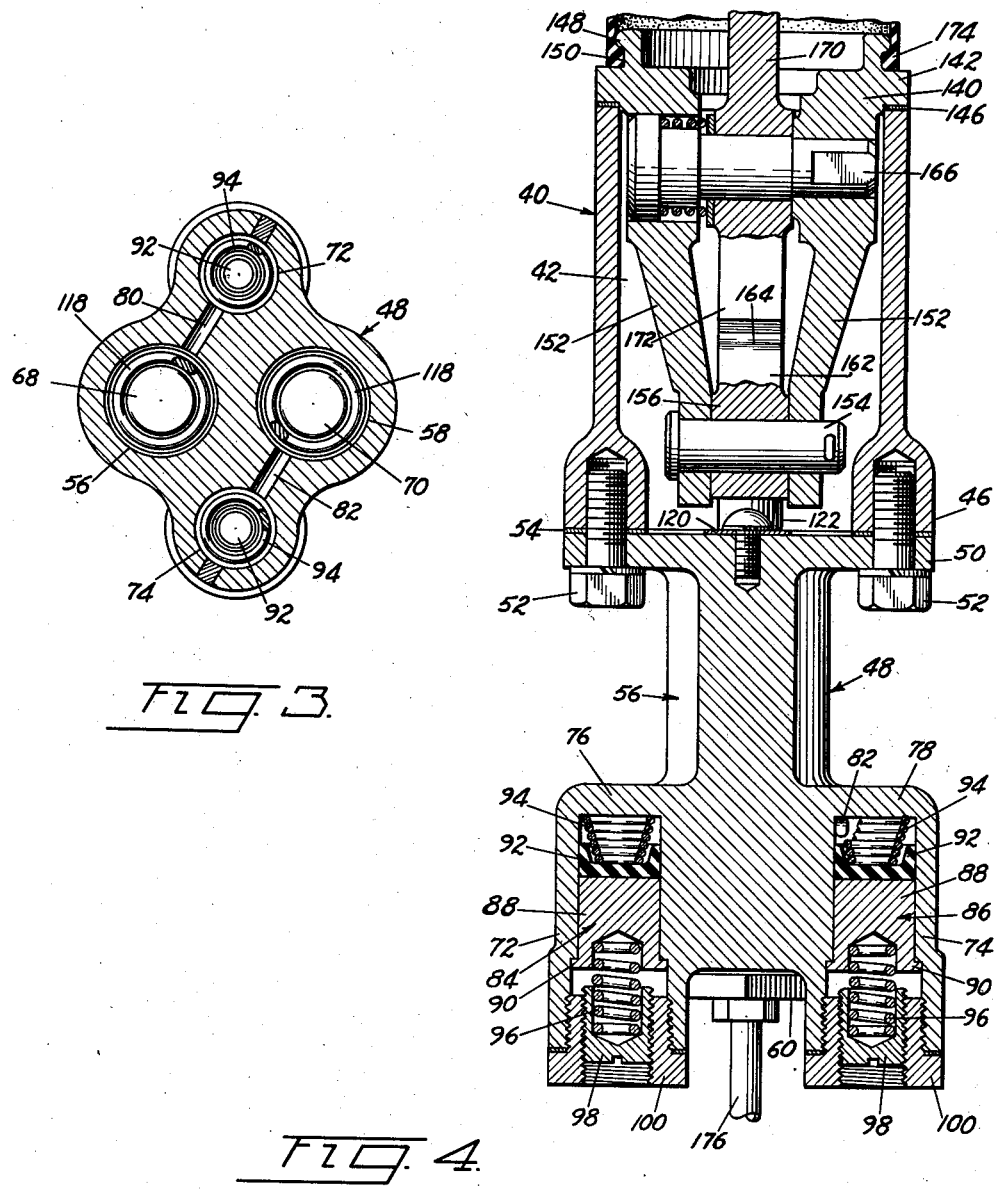
INVENTOR.
AARON A. LOWEKE
BY
ATTORNEY.

Feb. 6, 1940.  A. A. LOWEKE  2,189,013
FLUID PRESSURE SYSTEM
Filed Dec. 11, 1937  3 Sheets-Sheet 3
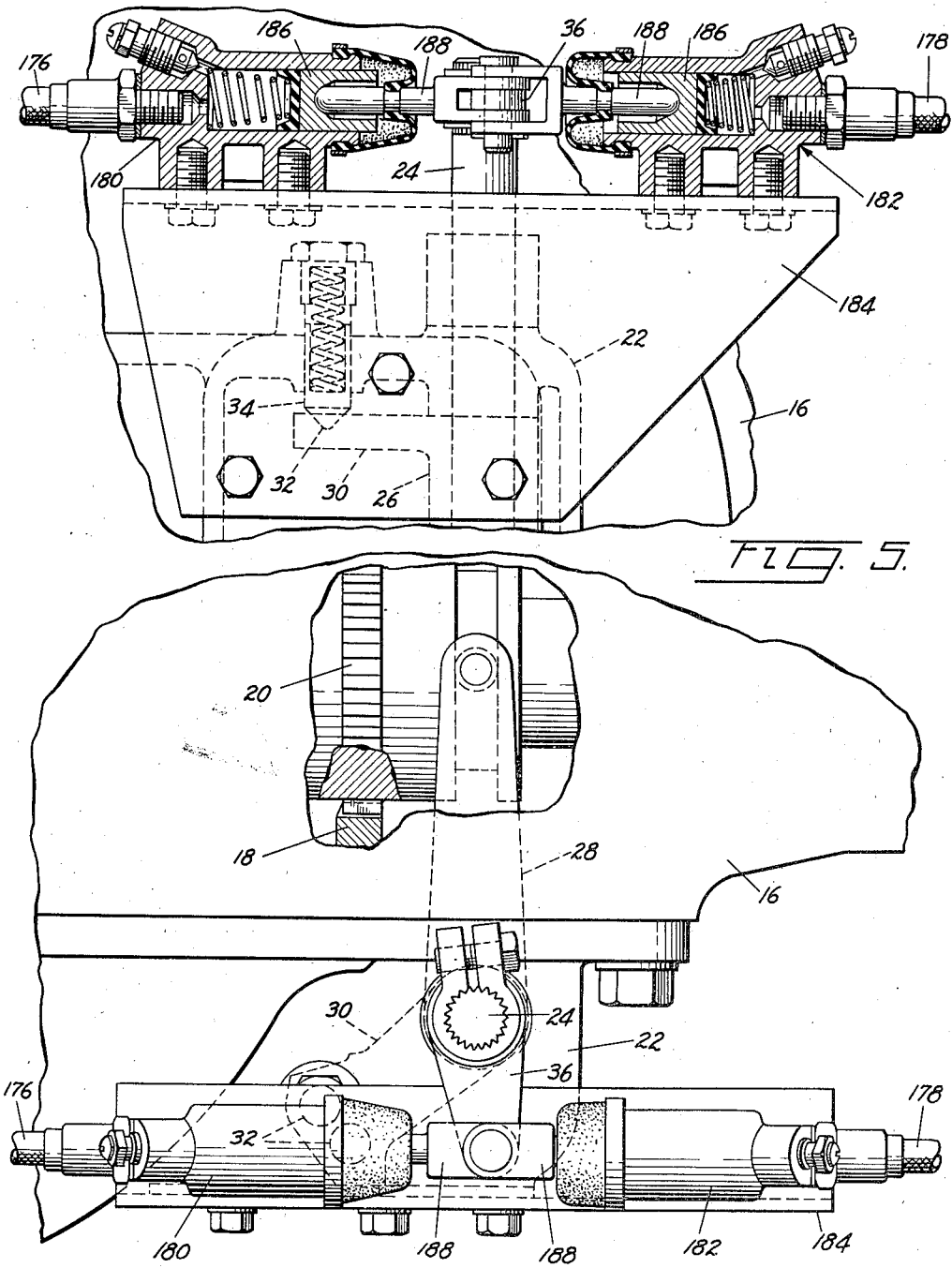
INVENTOR.
AARON A. LOWEKE
BY
ATTORNEY.

Patented Feb. 6, 1940

2,189,013

UNITED STATES PATENT OFFICE 2,189,013

FLUID PRESSURE SYSTEM

Aaron A. Loweke, Detroit, Mich., assignor to Hydraulic Brake Company, Detroit, Mich., a corporation of California Application December 11, 1937, Serial No. 179,370

4 Claims. (Cl. 60—54.5)

This invention relates to fluid pressure systems.

Broadly the invention comprehends a fluid pressure system including a duplex fluid pressure producing device having connected thereto a pair of fluid pressure actuated motors arranged for the operation of a shiftable element.

An object of the invention is to provide a fluid pressure system including a fluid pressure producing device having means compensating for overcharging of the systems.

Another object of the invention is to provide a fluid pressure producing device including means for producing pressure and expansible means operative after attaining a predetermined pressure so as to stabilize the pressure.

A feature of the invention is a cylinder, a piston movable therein for creating pressure, and a chamber communicating with the cylinder having therein a spring-pressed piston.

Other objects and features of the invention will appear from the subjoined description taken in connection with the accompanying drawings, in which—

Fig. 1 is a top plan view of a motor vehicle chassis illustrating the invention as applied;

Fig. 2 is a vertical sectional view of the fluid pressure producing device;

Fig. 3 is a cross-sectional view, substantially on line 3—3, Fig. 2;

Fig. 4 is a sectional view substantially on line 4—4, Fig. 2;

Fig. 5 is a fragmentary view partly in section illustrating the actuating mechanism of a transmission including the fluid pressure actuated motors; and Fig. 6 is a fragmentary view illustrating the connection of the motors to the actuating mechanism for the transmission and the connection of the actuating mechanism to the transmission.

Referring to the drawings for more specific details of the invention, 10 represents the frame of a motor vehicle chassis supported on springs, not shown, suspended from a front axle, also not shown, and a rear axle 12 having mounted thereon, for rotation, wheels 14 of conventional type. The axle 12 has connected therein a differential 16, and associated with the differential is a transmission 18 including a shiftable gear 20.

A casing 22 suitably secured to the housing of the transmission has mounted therein for oscillation a shaft 24 extending through and beyond the casing. The shaft has secured thereon within the casing a sleeve 26 supporting a fork 28 embracing the shiftable gear 20, and an arm 30 provided with spaced recesses 32 arranged adjacent the free end of the arm for the reception of a spring-pressed plunger 34 mounted on the wall of the casing, and suitably secured to the shaft outside of the casing is an operating lever 36. By applying force to the lever 36, the shaft 24 is moved through an angle, and this movement of the shaft is transmitted through the fork 28 to the gear 20, resulting in shifting the transmission to either high or low speed positions, where it is retained by the spring-pressed plunger entering one of the recesses 32 in the arm 30.

A fluid pressure producing device indicated generally at 40, includes a fluid reservoir 42 open at its top and also at its bottom. The reservoir has a radial flange 44 at its top, and a corresponding radial flange 46 at its bottom. A casting 48 has a radial flange 50 secured as by bolts 52 to the flange 46 at the bottom of the reservoir with a gasket 54 interposed so as to effectively seal the union of the reservoir and the casting. This casting 48 includes corresponding parallel cylinders 56 and 58, opening into the reservoir at their upper ends, and closed at their lower ends by heads 60 and 62 provided with discharge ports 64 and 66 controlled as by two-way valves 68 and 70.

The casting also includes a pair of corresponding oppositely disposed double diametral cylinders 72 and 74, closed at the ends thereof having the smaller diameters as by heads 76 and 78, and open at the ends having the larger diameter. The cylinder 72 is connected as by a passage 80 to the cylinder 56, and the cylinder 74 is connected as by a passage 82 to the cylinder 58.

Corresponding pistons 84 and 86 reciprocable in the cylinders 72 and 74 each include a body 88, fitted in that portion of the cylinder having the smaller diameter, and a flange 90 fitted in that portion of the cylinder having the larger diameter. The flange normally seats on the annular shoulder at the junction of the large and small chambers of the cylinder. The piston has on its head a sealing cup 92 for inhibiting the seepage of fluid past the piston, and a spring 94 interposed between the cup and the head of the piston serves to retain the cup against displacement. A recess in the back of the piston receives one end of a spring 96, and the other end of this spring is seated in a recess in an adjustable screw 98 mounted for travel in a plug 100 threaded in the open end of the cylinder.

Corresponding pistons 102 and 104 are mounted for reciprocation in the cylinders 56 and 58.

Each of these pistons includes a shell 106, open at one of its ends and closed at its other end. The closed end provides a head 108, and this head has an axial port 110 providing a communication between the shell and that portion of the cylinder forward of the piston. A sealing cup 112 seated on the head 108 has an axial opening 114 of somewhat smaller diameter than the diameter of the port so that the perimeter defining the opening slightly overhangs the port. A spring seat 116 nestled in the cup receives one end of a spring 118 interposed between the seat and the valve controlling the discharge port of the cylinder. This spring serves to retain the cup and valve against displacement, and also to return the piston to its normal or retracted position against a stop 120.

A plunger 122, reciprocable in the shell 106, has one of its ends reduced so as to provide an annular shoulder 124 normally abutting the stop 120. The other end of the plunger has a reduced portion providing an annular shoulder 126, and interposed between this shoulder and the back of the head of the shell is a spring 128 normally urging the plunger to its retracted position. The plunger has a plurality of spaced longitudinal passages 130 providing communications between the reservoir and the port 110 in the head 108, and an extension 132 adapted to enter and close the port and also to engage the overhanging perimeter of the cup so as to effectively seal the port.

A pin 134 on the extension 132 projects through the port 110 in the shell and the opening in the sealing cup 114. The pin has on its free end a head 136, of greater diameter than the port 110 in the head 108, and the pin and its head are slotted as at 138. The pin serves to retain the plunger within the shell during the retraction stroke of the piston, and the slots 138 provide for the passage of fluid through the port in the shell and the opening in the sealing cup as the piston moves to its retracted position.

A ring 140 has a radial flange 142 secured to the flange 44 at the top of the reservoir as by bolts 144, with a suitable gasket 146 interposed. This ring has a concentric flange 148 provided with a circumferential groove 150, the object of which will hereinafter appear, and depending from the ring into the reservoir are corresponding diametrically disposed arms 152. A shaft 154 mounted on the free end of the arms has journaled thereon a walking beam 156 including diametrically disposed arms 158 and 160 engaging the plungers 122 of the pistons 102 and 104, and a centrally disposed upwardly extended arm 162 having on its free end a tooth 164. A shaft 166 mounted in the arms 152 above and parallel to the shaft 154, and secured against displacement by a set screw 168, has mounted thereon an operating lever 170. This operating lever has on its lower end a tooth 172 for cooperation with the tooth 164 on the sleeve, and sleeved on the operating lever is a flexible boot 174 having a bead on its lower edge fitted in the groove 150 in the flange 148.

The discharge ports 64 and 66 of the cylinders 56 and 58 are connected by fluid pressure delivery pipes or conduits 176 and 178 to fluid pressure actuated motors 180 and 182 arranged in oppositely disposed relation to one another on a suitable bracket 184, bolted or otherwise secured to the casing 22, and the pistons 186 of the respective motors are connected as by a thrust pin 188 to the shifting lever 36 of the transmission.

In a normal operation, upon actuating the operating lever 170, the tooth 172 thereon engages the tooth 164 on the arm 162 of the walking beam 156 and transmits force thereto, resulting in rocking the walking beam. This movement of the walking beam imparts force through the arm 158 thereof to the plunger 122 of the piston 102, resulting in advancing the plunger.

During the initial movement of the plunger 122, the extension 132 thereon enters and effectively closes the port 110 in the head of the piston 102, and thereafter the plunger and piston move on the compression stroke of the piston as a single unit. As the piston advances on its compression stroke, the fluid in the cylinder 48 forward of the piston is displaced therefrom, past the two-way valve 68, through the discharge port 64 and the fluid pressure delivery pipes or conduits 176 into the fluid pressure actuated motor 180, resulting in energization of the motor. This energization of the motor 180 results in shifting the lever 36 and the transmission of force therefrom to the shaft 24 and the fork 28 to the gear 20, resulting in shifting the transmission to the low speed position where it is retained by the spring-pressed plunger 34 seated in one of the recesses 32 in the arm 30.

Upon completion of this operation, the tooth 172 of the operating lever 170 overrides the tooth 164 on the arm 162 of the walking beam, whereupon the piston 102 is released and is returned under the influence of the spring 118 to its retracted position against the stop 120, and during the return of the piston to its retracted position there is relative movement between the plunger 122 and the piston 102, due to the tension on the spring 128, resulting in opening the port 110 in the head 108 of the piston and thereby establishing communication between the reservoir and that portion of the cylinder 48 forward of the piston, and as the piston and its associated plunger return to their retracted positions, the walking beam 156 is returned to its normal position.

When it is desired to shift the transmission from the low speed position to the high speed position, the operator shifts the operating lever 170 from its forward position backwardly. This movement of the operating lever again engages the tooth 172 on the operating lever with the tooth 164 on the arm 162 of the walking beam, and transmits force thereto resulting in rocking the walking beam. This rocking of the walking beam transmits force therefrom through the arm 160 to the plunger 122 of the piston 104, resulting in advancing the plunger. During the initial movement of the plunger, the extension 132 thereon enters and closes the port 110 in the head of the piston 104, and thereafter the plunger and piston move on the compression stroke as a single unit.

As the piston advances on its compression stroke, the fluid in the cylinder 58 forward of the piston is displaced therefrom, past the two-way valve 70, through the discharge port 66 and fluid pressure delivery pipe 178, into the fluid pressure actuated motor 182, causing energization of the motor. This energization of the motor results in shifting the lever 36, and this movement of the lever 36 rocks the shaft 24 and shifts the fork 28 and the gear 20 embraced thereby, resulting in shifting the transmission to the high speed position.

In shifting the transmission, it is highly desirable that the fluid pressure producing device and the fluid pressure motors connected thereto be brought into phase or synchronized, in order that the maximum displacement of the fluid pressure producing device may be substantially equal to the maximum displacement of the fluid pressure actuated motors so that movement of the latter may be positively arrested at the end of the stroke. In the past this has been found difficult because of an excess of fluid in the system due to expansion and other causes, such as rocking of the operating lever 170, resulting in pumping fluid into the system. Under these conditions the column of fluid under pressure may be in excess of that necessary to effectively shift the transmission, and, accordingly, the trapping action between the operating lever and walking beam is rendered impossible because of the locking action between the tooth 172 on the operating lever and the tooth 164 on the walking beam. To avoid this condition, the cylinders 56 and 58 have connected thereto auxiliary cylinders 72 and 74 having therein spring-pressed pistons 84 and 86, yieldable upon attaining a predetermined pressure in the cylinders 56 and 58, the pressure in the cylinders being determined by the load on the springs 96 normally urging the pistons 86 and 88 to their seats.

Although this invention has been described in connection with certain specific embodiments, the principles involved as susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure producing device comprising a reservoir, a pair of cylinders supplied therefrom, pistons reciprocable in the cylinders, a support on the top of the reservoir, arms depending from the support into the reservoir, a walking beam supported by the arms for actuating the pistons, and an operating lever mounted between the arms cooperating with the walking beam.

2. A fluid pressure producing device comprising a reservoir, a pair of cylinders depending from and communicating therewith, pistons reciprocable in the cylinders, a support on top of the reservoir, arms depending from the support into the reservoir, a walking beam supported by the arms for actuating the pistons, an upwardly extending arm on the walking beam, an operating lever mounted between the arms, and an extension on the operating lever cooperating with the upwardly extended arm on the walking beam.

3. A fluid pressure producing device comprising a reservoir, a pair of cylinders depending therefrom and communicating therewith, pistons reciprocable in the cylinders, an auxiliary cylinder communicating with each of the cylinders, fluid pressure actuated pistons in the auxiliary cylinders, springs resisting movement of the pressure actuated pistons, means for regulating the load on the respective springs, a support on the top of the reservoir, arms depending from the support into the reservoir, a walking beam supported on the arms for actuating the pistons, an upwardly extended arm on the walking beam, an operating lever mounted between the arms, an extension on the operating lever cooperating with the arm on the walking beam, and a flexible boot sleeved on the operating lever embracing the support on the top of the reservoir.

4. A fluid pressure system comprising a reservoir, a pair of cylinders depending therefrom and communicating therewith, fluid pressure actuated motors connected to the cylinders, a shiftable element connected between the motors, a piston reciprocable in each of the cylinders, an auxiliary cylinder connected to each of the cylinders, a fluid pressure actuated piston in each of the auxiliary cylinders, springs resisting movement of the pressure actuated pistons, means for regulating the tension on the springs, a ring on the top of the reservoir, arms depending from the ring into the reservoir, a walking beam supported between the arms for actuating the pistons, an operating lever mounted between the arms cooperating with the walking beam, and a flexible boot sleeved on the operating lever embracing the ring on the top of the reservoir.

AARON A. LOWEKE.